United States Patent [19]
Fisher et al.

[11] 3,710,637
[45] Jan. 16, 1973

[54] TRANSMISSION

[75] Inventors: John F. Fisher, Jackson, Mich. 49202; Burton S. Zeller, Parma, Mich. 49269

[73] Assignee: Clark Equipment Company, Buchanan, Mich.

[22] Filed: Sept. 30, 1971

[21] Appl. No.: 185,110

[52] U.S. Cl. ............................................... 74/331
[51] Int. Cl. ............................................. F16h 3/08
[58] Field of Search ................................... 74/331

[56] References Cited

UNITED STATES PATENTS

| | | | |
|---|---|---|---|
| 2,825,232 | 3/1958 | Sieving et al. | 74/331 |
| 2,867,126 | 1/1959 | Bolster | 74/360 |
| 3,080,767 | 3/1963 | Price, Jr. | 74/360 |
| 3,318,167 | 4/1967 | Frost | 74/331 |

*Primary Examiner*—Leonard H. Gerin
*Attorney*—Kenneth C. Witt et al.

[57] ABSTRACT

A multispeed reversible transmission has a pair of countershafts that are interconnected for counter rotation and a plurality of gear trains for selectively connecting the countershafts to drive the output shaft at various speed ratios. A pair of input clutches are separately engageable to drive the countershafts in either of the two counter rotative directions and a splitter clutch is provided to drive these shafts in one counter direction at a speed ratio lower than that at which they are driven when the input clutches are engaged.

7 Claims, 1 Drawing Figure

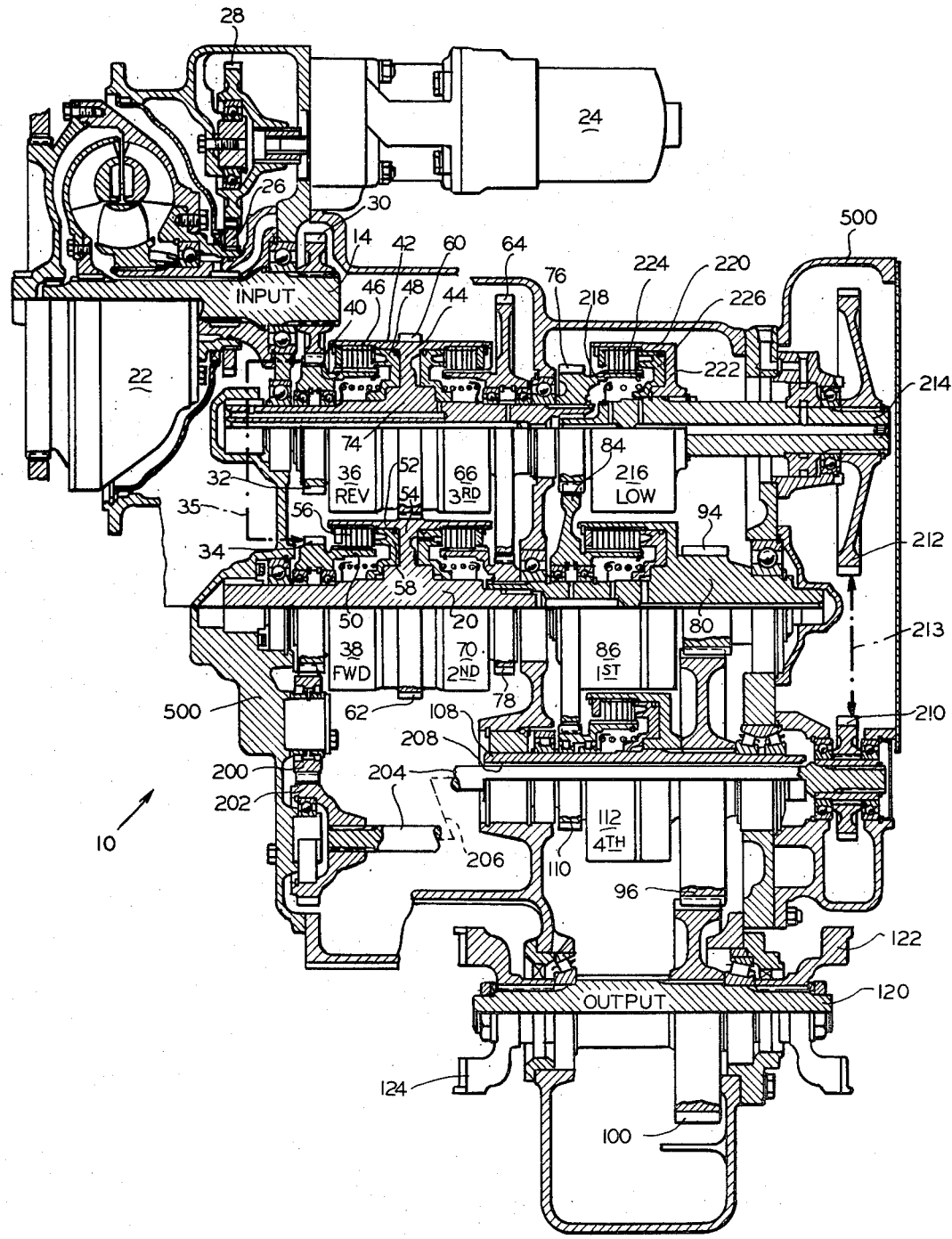

TRANSMISSION

BACKGROUND OF THE INVENTION

The field of art to which this invention pertains includes power transmission mechanisms and more specifically such mechanisms as have multiple forward and reverse gearing.

In multiple speed geared transmission it is desirable to arrange the transmission's major components in such a way that a variety of additional components may be easily added to the basic mechanism. In this manner the manufacturer of a particular transmission adapted to meet unique criteria is facilitated and therefore unit cost is reduced and dependability improved. Such a basic transmission arrangement is disclosed in U.S. Pat. No. 3,465,609 (issued Sept. 9, 1969) as well as certain modifications to the basic arrangement which are adapted to fulfill common requirements.

One object of this invention is to provide a further modification to the basic transmission mechanism disclosed in U.S. Pat. No. 3,465,609 so that such basic mechanism may be easily modified to fulfill a further set of common requirements.

SUMMARY OF THE INVENTION

In carrying out our invention in a preferred embodiment thereof, we provide a transmission having a plurality of drive means for a pair of countershafts which are interconnected for counter rotation. The countershafts may be selectively connected to an output shaft through a variety of drive trains to drive the output shaft at a variety of speed ratios relative to the countershafts. The countershafts may be connected to be driven by an input shaft in one counter direction at one speed ratio by the engagement of a clutch connecting one of the countershafts to the input shaft, and the countershafts may be connected to be driven by the input shaft in the other counter direction at either of two speed ratios by the engagement of either of two clutches connecting this other countershaft to the input shaft through separate drive trains.

The principal objects, features, and advantages of our invention will be more readily understood by persons skilled in the art when the following detailed description is taken in conjunction with the drawing.

BRIEF DESCRIPTION OF THE DRAWING

The drawing is a longitudinal view, partially in section, of a preferred embodiment of the invention.

DESCRIPTION OF PREFERRED EMBODIMENT

Referring to the drawing, the reference numeral 10 denotes generally a transmission having a housing 500 in which an input shaft 14, output shaft 120, and a pair of countershafts 74 and 20 are journaled for rotation.

Input shaft 14 is driven by means of a hydrodynamic torque converter 22 to which shaft 14 is connected and torque converter 22 is in turn connected to any suitable source of power such as an internal combustion engine (not shown). Torque converter 22 also drives a pump 24 mounted on housing 500 through a pair of meshing gears 26 and 28 which are connected respectively to the torque converter and the drive shaft of the pump. Pump 24 provides pressurized fluid to operate the various fluid actuated clutches hereinafter explained which are associated with transmission 10.

Connected to input shaft 14 is an input gear 30 which meshes with a gear 32 mounted for rotation on countershaft 74 and also meshes with a gear 34 mounted for rotation on countershaft 20, as is indicated by the dashed line numbered 35. Gear 32 can be connected to shaft 74 for conjoint rotation therewith by engagement of a clutch 36, and similarly gear 34 can be connected to shaft 20 for conjoint rotation therewith by engagement of a clutch 38. Clutch 36 includes a hub 40 connected to gear 32 by any suitable means, such as welding, a double drum 42 which has a web 44 integral therewith, web 44 being fixed to shaft 74 by any suitable means such as welding, and a plurality of interleaved friction plates 46 alternately connected to hub 40 and drum 42. Clutch 36 may be engaged by supplying pressurized fluid from pump 24 behind a piston 48 which serves to press plates 46 together so that hub 40 is frictionally connected to drum 42 through plates 46.

Clutch 38 is a multiple plate fluid actuated type and includes a hub 50 connected to gear 34 by any suitable means, such as welding, a double drum 52 which has integral therewith a web 54 fixed to shaft 20 by any suitable means, such as welding, and a plurality of interleaved friction plates 56 alternately connected to hub 50 and drum 52. Clutch 38 may be engaged by supplying pressurized fluid from pump 24 behind a piston 58 which serves to press plates 56 together so that hub 50 may be frictionally connected to drum 52.

A gear 60 is formed integral with drum 42 and meshes with a gear 62 which is formed integral with drum 52 so that countershafts 74 and 20 are constantly interconnected through a single gear mesh and therefore these shafts must counter rotate in opposite directions. Noting that input gear 30 meshes with both gear 32 and gear 34 so that these two gears are rotatably driven by gear 30 in the same direction, it will now be understood that the engagement of clutch 36 will cause shafts 74 and 20 to counter rotate in one direction and that the engagement of clutch 38 will cause shafts 74 and 20 to counter rotate in the opposite direction.

A gear 64 is mounted for rotation on shaft 74 and can be connected to shaft 74 for conjoint rotation therewith by a fluid actuated multiple plate clutch 66 which is similar to clutch 36 and so will not be described further. A gear 78 meshes with gear 64 and is splined for conjoint rotation with a shaft 80 that is journaled for rotation within housing 500 concentric with countershaft 20. Gear 78 can be connected to shaft 20 for conjoint rotation therewith of both gear 78 and shaft 80 by means of a fluid actuated multiple plate clutch 70 which is similar to clutch 38 and so will not be described further.

A gear 76 is fixed for rotation with shaft 74 and meshes with a gear 84 which is mounted for rotation on shaft 80. Gear 84 can be connected to shaft 80 for conjoint rotation therewith by engagement of a fluid actuated multiple plate clutch 86 similar to those previously explained and it will now be clear that shaft 80 can be driven from shaft 74 via gears 64 and 78 when clutch 66 is engaged, or via gears 76 and 84 when clutch 86 is engaged, or driven directly with shaft 20 when clutch 70 is engaged.

Integral with shaft 80 is a gear 94 which meshes with a gear 96 fixed for rotation with a shaft 108. Shaft 108 is journaled for rotation within housing 500 and carries a gear 110 rotatably journaled thereupon which meshes with gear 84, gear 110 being connectable for rotation with shaft 108, and hence gear 96, by the engagement of a fluid actuated multiple friction plate clutch 112 which is similar to those clutches previously explained.

An output gear 100 is in mesh with gear 96 for the receipt of power therefrom and is fixed for conjoint rotation with output shaft 120 so that power may be delivered by transmission 10 by means of either drive coupling 122 or 124.

An idler gear 200 is rotatably supported from housing 500 and meshes with both gear 34 and a gear 202 which is fixed for conjoint rotation with a shaft 204. Shaft 204 is journaled for rotation within housing 500 concentric with shaft 108 as indicated by the dashed offset line numbered 206 and shaft 204 passes through shaft 108 within an axial bore 209 therein so that shafts 204 and 108 are free to rotate relative to one another. A gear 210 is carried by shaft 204 for conjoint rotation therewith and meshes, as indicated by the dashed line numbered 213, with a gear 212. Gear 212 is fixed for conjoint rotation with a shaft 214 journaled for rotation concentric with shaft 74 within housing 500 and, although shaft 214 is free to rotate relative to shaft 74, shaft 214 may be connected for conjoint rotation with shaft 74 by means of a "splitter" clutch 216 which is a fluid actuated multiple friction plate type clutch similar to those clutches previously explained. Specifically, splitter clutch 216 includes a hub 218 connected to gear 76 by any suitable means, such as welding, a drum 220 which has a web 222 integral therewith, web 222 being fixed to shaft 214 by any suitable means such as welding, and a plurality of interleaved friction plates 224 alternately connected to hub 218 and drum 220. Clutch 216 may be engaged by supplying pressurized fluid from pump 24 behind 226 which serves to press plates 224 together so that hub 218 is frictionally connected to drum 220 through plates 224.

It will now be understood that transmission 10 provides four basic speed ratios between input shaft 14 and output shaft 120 in what may arbitrarily be called a "-positive" or "forward" direction, and also provides four basic speed ratios in what may arbitrarily be called a "negative" or "reverse" direction. It will be recognized that the engagement of clutch 38 may be utilized to condition the transmission for such forward drive and that the engagement of clutch 36 may be utilized to condition the transmission for such reverse drive and further that the selective separate engagement of either clutch 86, 70, 66, or 112 may designate the desired speed ratio. By way of explanation, each of these four basic forward and four basic reverse speed ratios is listed below, followed by the particular components of transmission 10 employed in the drive train in the order in which such components receive and then transmit power to the next component in line:

First-Forward [clutches 38 and 86 engaged] Input gear 30, gear 34, clutch 38, gear 62, gear 60, shaft 74, gear 76, gear 84, clutch 86, gear 94, gear 96, gear 100, and output shaft 120.

First-Reverse [clutches 36 and 86 engaged] Input gear 30, gear 32, clutch 36, shaft 74, gear 76, gear 84, clutch 86, gear 94, gear 96, gear 100, and output shaft 120.

Second-Forward [clutches 38 and 70 engaged] Input gear 30, gear 34, clutch 38, clutch 70, gear 78, shaft 80, gear 94, gear 96, gear 100, and output shaft 120.

Second-Reverse [clutches 36 and 70 engaged] Input gear 30, gear 32, clutch 36, gear 60, gear 62, clutch 70, gear 78, shaft 80, gear 94, gear 96, gear 100, and output shaft 120.

Third-Forward [clutches 38 and 66 engaged] Input gear 30, gear 34, clutch 38, gear 62, gear 60, clutch 66, gear 64, gear 78, shaft 80, gear 94, gear 96, gear 100, and output shaft 120.

Third-Reverse [clutches 36 and 66 engaged] Input gear 30, gear 32, clutch 36, clutch 66, gear 64, gear 78, shaft 80, gear 94, gear 96, gear 100, and output shaft 120.

Fourth-Forward [clutches 38 and 112 engaged] Input gear 30, gear 34, clutch 38, gear 62, gear 60, shaft 74, gear 76, gear 84, gear 110, clutch 112, shaft 108, gear 96, gear 100, and output shaft 120.

Fourth-Reverse [clutches 36 and 112 engaged] Input gear 30, gear 32, clutch 36, shaft 74, gear 76, gear 84, gear 110, clutch 112, shaft 108, gear 96, gear 100, and output shaft 120.

At this point it will have been observed that in each of the four basic forward speed ratios explained above clutch 38 is engaged to drivingly counter rotate the two countershafts 20 and 74 at rotative speeds relative to input shaft 14 which are determined by the pitch diameters of gears 30 and 34. It should now be further observed that the arrangement of transmission 10 provides, through splitter clutch 216, an alternate or additional means for driving countershafts 20 and 74 and that when clutch 216 is engaged these countershafts are driven in what has arbitrarily been designated the forward direction. The particular gear train incorporated in transmission 10 to drive splitter clutch 216 (including, in order, gear 30, gear 34, gear 200, gear 202, shaft 204, gear 210, gear 212 and shaft 214) has been selected so that when clutch 216 is engaged the rotative speeds at which countershafts 74 and 20 are driven are lower than the speeds at which these shafts are driven when forward drive clutch 38 is engaged. It is, therefore, seen that transmission 10 provides, in addition to the four basic forward and reverse speed ratios explained above, four intermediate forward speed ratios which can be called first-low, second-low, third-low, and fourth-low because they are individually lower in speed ratio than their respective basic speed ratio. By way of explanation, each of these four intermediate low speed ratios is listed below followed by the particular components of transmission 10 employed in the drive train in the order in which such components receive and then transmit power to the next component in line (beginning in each case with splitter clutch 216):

First-low [clutches 216 and 86 engaged] Clutch 216, gear 76, gear 84, clutch 86, gear 94, gear 96, gear 100, and output shaft 120.

Second-low [clutches 216 and 70 engaged] Clutch 216, gear 76, shaft 74, gear 60, gear 62, clutch 70, gear 78, shaft 80, gear 94, gear 96, gear 100, and output shaft 120.

Third-Low [clutches 216 and 66 engaged] Clutch 216, gear 76, shaft 74, clutch 66, gear 64, gear 78, shaft 80, gear 94, gear 96, gear 100, and output shaft 120.

Fourth-Low [clutches 216 and 112 engaged] Clutch 216, gear 76, gear 84, gear 110, clutch 112, gear 96, gear 100, and output shaft 120.

It will now be appreciated that by adding splitter clutch 216 (and its associated drive train) to the basic portion of transmission 10 the number of forward speed ratios provided by the transmission has been doubled. Further, it will be appreciated that the modifications to the basic transmission which are required to double the number of forward speeds available in this manner are not substantial.

While we have disclosed a preferred embodiment of our invention, it will be understood that certain modifications and changes may be made in this embodiment without departing from the scope and spirit of our invention. Consequently, the limits of our invention should be determined from the following claims.

We claim:

1. In a transmission having an input shaft with an input gear fixed thereto, first and second countershafts interconnected for counter rotation, first and second clutch means for separately connecting one or the other of the countershafts to be driven by the input gear, an output shaft, and means for drivingly connecting the output shaft to the driven countershaft including an intermediate shaft; the improvement comprising an additional means for driving the first countershaft, said additional driving means including a first gear connected to be driven by the input shaft and a third clutch means for selectively connecting said first gear to the first countershaft for conjoint rotation therewith.

2. An additional drive means as set forth in claim 1 and including a first shaft concentric with the first countershaft, said first gear being fixed to said first shaft for conjoint rotation therewith and said third clutch selectively connecting said first shaft to the first countershaft for conjoint rotation therewith.

3. An additional drive means as set forth in claim 2 and including a second gear in mesh with the input gear, said second gear being mounted for rotation on the second countershaft and connected to drive said first gear.

4. An additional drive means as set forth in claim 3 and including a third gear in mesh with said second gear, a second shaft, a fourth gear fixed to said second shaft for rotation therewith and in mesh with said third gear, and a fifth gear in mesh with said first gear and fixed to said second shaft for rotation therewith.

5. An additional drive means as set forth in claim 4 wherein said second shaft is concentric with the intermediate shaft between the driven countershaft and the output shaft.

6. A transmission comprising an input shaft, a first gear fixed to said input shaft, a first countershaft, a second countershaft and in mesh with said first gear, first clutch means for connecting said second gear to said first countershaft for conjoint rotation therewith, a third gear mounted for rotation on said second countershaft and in mesh with said first gear, second clutch means for connecting said third gear to said second countershaft for conjoint rotation therewith, a fourth gear fixed to said first countershaft, a fifth gear fixed to said second countershaft and in mesh with said fourth gear, a sixth gear mounted for rotation on said first countershaft, third clutch means for connecting said sixth gear to said first countershaft for conjoint rotation therewith, a seventh gear mounted for rotation on said second countershaft and in mesh with said sixth gear, fourth clutch means for connecting said seventh gear to said second countershaft for conjoint rotation therewith, and eighth gear fixed to said first countershaft, a first shaft fixed to said seventh gear, a ninth gear mounted for rotation on said first shaft and in mesh with said eighth gear, fifth clutch means for connecting said ninth gear to said shaft for conjoint rotation therewith, an output shaft, a tenth gear fixed to said first shaft, an eleventh gear fixed to said output shaft, a second shaft, a twelfth gear fixed to said second shaft and meshing with said tenth and eleventh gears, a thirteenth gear mounted for rotation on said second shaft and meshing with said ninth gear, sixth clutch means for connecting said thirteenth gear to said second shaft for conjoint rotation therewith, a third shaft concentric with said first countershaft, seventh clutch means for connecting said eighth gear to said third shaft for conjoint rotation therewith, a fourteenth gear fixed for rotation with said third shaft, a fourth shaft concentric with said second shaft, a fifteenth gear fixed for rotation with said fourth shaft and in mesh with said fourteenth gear, a sixteenth gear fixed for rotation with said fourth shaft, and a seventeenth gear in mesh with said sixteenth gear and said third gear.

7. A transmission according to claim 6 wherein said second shaft has an axial bore therethrough and said fourth shaft passes axially through said bore.

* * * * *